Patented Oct. 29, 1940

2,219,395

UNITED STATES PATENT OFFICE 2,219,395

MANUFACTURE OF PIGMENTED OIL COMPOSITIONS

John Lewis Moilliet, Blackley, Manchester, England, assignor to Imperial Chemical Industries Limited, a corporation of Great Britain No Drawing. Application June 22, 1938, Serial No. 215,272. In Great Britain June 24, 1937

8 Claims. (Cl. 134—58)

This invention relates to the manufacture of pigmented oil compositions.

It is known to prepare dispersions of pigments in oils by kneading together an aqueous pigment paste with an oil until the solid pigment is transferred into the oil, leaving a separate aqueous phase which is relatively poor in the solid and which can readily be decanted off or poured away. Such a procedure has particular utility in the preparation of printing inks. Further, such a process is particularly attractive for use with artificial pigments which are produced in the course of their manufacture in the form of aqueous pastes since it renders unnecessary the expense and trouble of predrying the pigment paste as well as the difficulties which frequently arise when a dry pigment is to be ground with an oil. In practice, however, such a process cannot be applied to all such pigments and all oil media, since in many cases the desired transfer of the solid pigment into the oil medium fails to occur or occurs too slowly to have technical utility. This is particularly true where the object is, as is frequently the case for obvious technical reasons, to produce a pigmented oil-composition containing a high proportion of pigment.

In the co-pending application filed July 22, 1936, by Clifford Kanne Sloan and Gordon Derby Patterson under Serial No. 91,967, now Patent No. 2,192,954, granted March 12, 1940, it is proposed to assist the transfer of pigments from aqueous to non-aqueous water-immiscible media by the use of cationic surface-active compounds such as salts of nitrogenous organic bases or quaternary ammonium or phosphonium or ternary sulphonium compounds, all of these compounds having an aliphatic radical of at least eight carbon atoms attached to that portion of the molecule which on ionisation of the compound yields the cation. Such compounds materially assist the transfer of pigments from aqueous to oil media. It sometimes happens, however, that when an aqueous pigment paste is mixed with an oil in the presence of one of these cationic surface-active compounds, the pigment is transferred to the oil, but the pigmented oil phase remains mixed with the aqueous phase and may even absorb a portion of the latter in the form of a water-in-oil emulsion. In such cases the bulk of the aqueous phase cannot simply be decanted off, but must be removed by the troublesome process of filtration and/or drying.

I have now found that where such difficulties arise, they may be overcome by adding to the kneaded mass an agent adapted to give oil-in-water emulsions. I have found that sulphonated fatty acids or sulphonated fatty oils or sulphonated aromatic compounds such as isopropylated naphthalene sulphonates, or fatty alcohol sulphuric esters, for example, are particularly suitable in this connection. These agents reverse the objectionable water-in-oil emulsions and gather the oil and pigment into a coherent mass, thus facilitating proper separation of the water.

Thus according to the invention I knead together an oil medium and an aqueous pigment paste as hereinafter defined in presence of a cationic surface-active compound until the ingredients have become thoroughly mixed, after which I add an agent adapted to give oil-in-water emulsions and continue the kneading until the pigment and oil gather together as a coherent mass and the water separates and may be decanted away.

As already indicated, the aqueous pigment pastes which are to be treated according to the invention are those of artificial pigments which are produced in the course of their manufacture as aqueous pastes. Further, the pastes are preferably of a high solid content, and in any case the solid content should be so high that the consistency is semi-solid and the pastes are not readily pourable. Suitable pigment pastes are those of, for example, the phosphotungstomolybdic lake of Brilliant Green Y (Colour Index No. 662), the phosphotungstomolybdic lake of Methyl Violet 2B (Colour Index No. 680), the barium lake of Lake Red C (1928 supplement to Colour Index No. 165), phthalocyanine (see Example 7 of British Specification 410,814) and Prussian blue.

In carrying the invention into effect the cationic surface-active compound may be added to the aqueous pigment paste or the oily medium before these are brought together in the kneading operation. Alternatively, for example, the pigment paste and the oily medium may be introduced into a machine suitable for kneading them together and the necessary compound added before kneading is commenced or during the process of kneading. A convenient amount of quaternary ammonium or other cationic surface-active compound is from ½ to 3% calculated on the dry weight of pigment. Kneading in the presence of the above defined compounds is continued until the ingredients have become throughly mixed which can be seen if necessary by inspection of samples of the kneaded mass. The Turkey red oil or other similar agent is then added, kneading is continued and the water layer which separates is decanted off or removed in any other convenient way, leaving a stiff pigmented oil composition containing only a small proportion of water. Where the pigmented compositions are to be used for printing ink purposes it is advantageous to remove the residual traces of water by, for example, drying the compositions at moderately raised temperatures under diminished pressure or by passing the compositions over a heated roller.

The following examples in which the parts are by weight, illustrate but do not limit the invention.

*Example 1*

128 parts of an aqueous 25% paste of the phosphotungstomolybdic lake of Methyl Violet 2B (Colour Index No. 680) and 3.2 parts of an aqueous 10% solution of cetyltrimethylammonium bromide are thoroughly mixed at 20° C. in a Werner-Pfleiderer mixer. The paste so obtained is intimately mixed with 32.5 parts of a thin stand oil lithographic varnish, after which there is added 0.5 part of a 50% soda-finished Turkey red oil. Mixing is then continued until a thick pigmented mass gathers on the blades of the mixer, leaving a substantially clear aqueous layer which is decanted off. This pigmented oily mass, when dried on a heater roller at 105° C., gives a printing ink of excellent gloss.

If in the above process the Turkey red oil is omitted, the pigment and oil do not gather into a coherent mass, and the water cannot, therefore, be decanted off.

*Example 2*

120 parts of an aqueous 33% paste of Prussian blue and 2 parts of cetyltrimethylammonium bromide are intimately mixed at 18° C. in a Werner-Pfleiderer mixer. The paste so obtained is vigorously mixed for half an hour with 54 parts of the lithographic varnish referred to in Example 1, after which there is added 0.5 part of the condensation product prepared according to Example 1 of British Specification No. 274,611. Mixing is then continued for a further 15 minutes, by which time the pigment and oil have formed a coherent mass on the blades of the mixer, leaving a substantially clear aqueous layer which is decanted away. The pigmented oily mass so-obtained when dried on a heated roller at 105° C. gives a printing ink of excellent gloss.

If in this process the above-mentioned condensation product is omitted very little water separates, and the pigmented oily mass remains finely divided and contains a large proportion of water, even after prolonged mixing.

As suitable agents adapted to give oil-in-water emulsions there may be used, for example, instead of the compounds specified in the examples, sodium cetyl sulphate, sodium dodecyl sulphate, highly sulphonated oleic acid or isopropylated naphthalene sulphonate.

Instead of the cationic surface-active compounds specific in the examples there may be used, for example, hexadecylamine hydrochloride, octadecyl trimethylammonium bromide, cetyl pyridinium bromide, cetyl trimethylammonium bromide or similarly constituted quaternary phosphonium or ternary sulphonium compounds.

As it will be apparent to those skilled in the art that modifications and variations of the invention other than those described in the examples may readily be made without departing from the spirit and scope thereof, it is not intended that the invention be limited except as indicated in the following claims.

I claim:

1. In a process of transferring a pigment from an aqueous system to an organic vehicle immiscible with water by mixing a water-wet pigment with a water-immiscible organic liquid vehicle in the presence of a water soluble cation-active agent selected from the class consisting of amines containing only one nitrogen atom, salts of amines containing only one nitrogen atom, quaternary ammonium compounds containing only one nitrogen atom, sulfonium compounds, phosphonium compounds, and salts thereof, said compounds containing an open chain aliphatic radical of at least 8 carbon atoms in chain length directly attached respectively to the nitrogen, sulfur, and phosphorus atoms, the steps which comprise adding a sulfonated fatty material to the mixture after the pigment transfer, and thereafter mixing until the pigment and oil gather together as a coherent mass separate from the water.

2. Process as claimed in claim 1 in which the cationic surface-active agent is a water-soluble salt of an amine, said compound being characterized by having only one nitrogen atom and having an open chain aliphatic radical of at least 8 carbon atoms in chain length directly attached to the nitrogen atom.

3. Process as claimed in claim 1 in which the cationic surface-active agent is a water soluble salt of a quaternary ammonium compound, said compound being characterized by having only one nitrogen atom and having an open chain aliphatic radical of at least 8 carbon atoms in chain length directly attached to the nitrogen atom.

4. Process as claimed in claim 1 in which the cationic surface-active agent is a water soluble salt of an organic compound having at least one ternary sulphonium radical and at least one long chain aliphatic radical containing at least 8 carbon atoms in chain length attached directly to the sulfur atoms.

5. Process as claimed in claim 1 wherein the agent adapted to give oil-in-water emulsions is a sulphonated fatty acid.

6. Process as claimed in claim 1 wherein the agent adapted to give oil-in-water emulsions is a sulphonated fatty oil.

7. Process as claimed in claim 1 wherein the agent adapted to give oil-in-water emulsions is a Turkey red oil.

8. Process as claimed in claim 1 wherein the pigment is an iron blue, the cationic surface-active agent is cetyl trimethylammonium bromide and the agent adapted to give oil-in-water emulsions is a Turkey red oil.

JOHN LEWIS MOILLIET.